May 28, 1935.  G. W. HARPER ET AL  2,002,813
BRAKE FOR AUTOMOTIVE VEHICLES
Filed Nov. 5, 1932  3 Sheets-Sheet 1
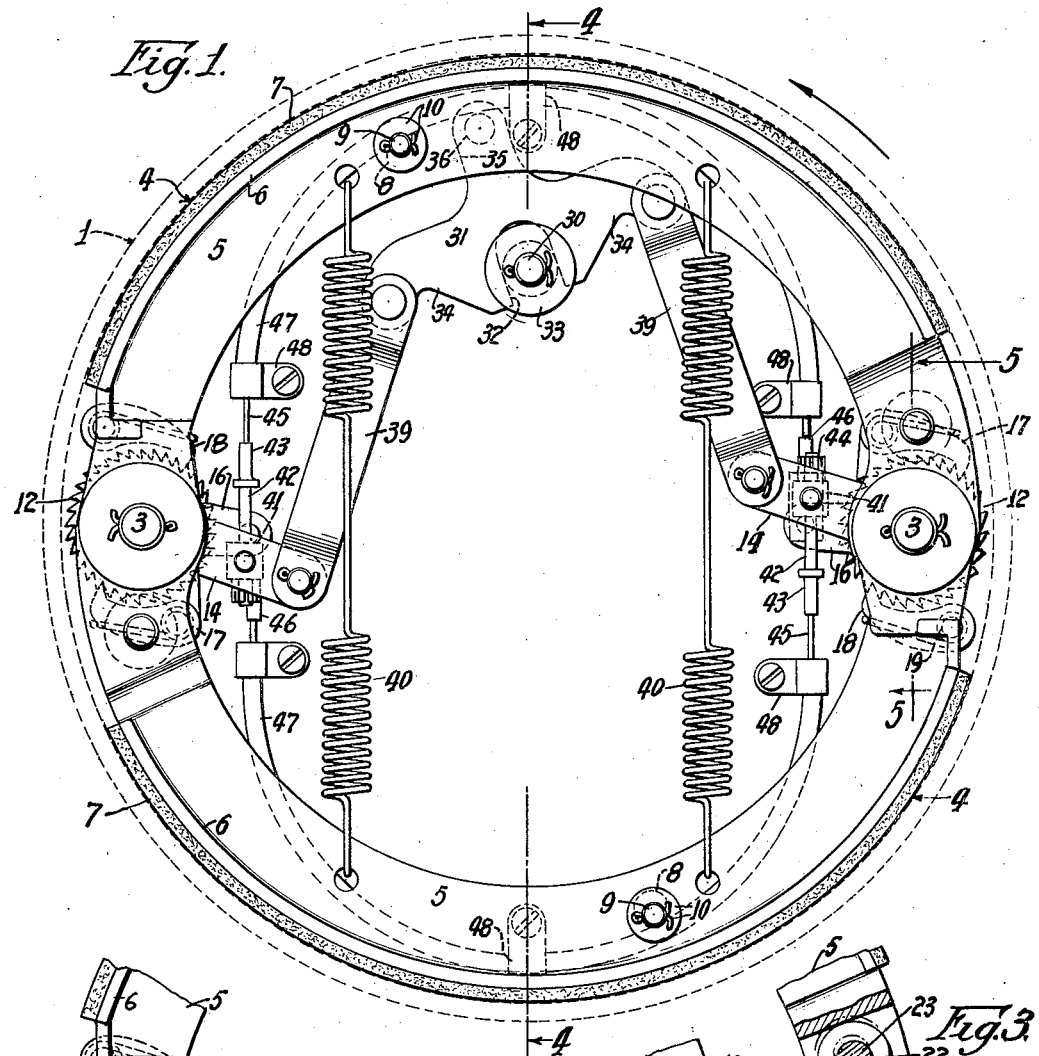
Inventors:
George W. Harper,
Albert R. Catto,
By Arthur Wm Nelson
Atty.

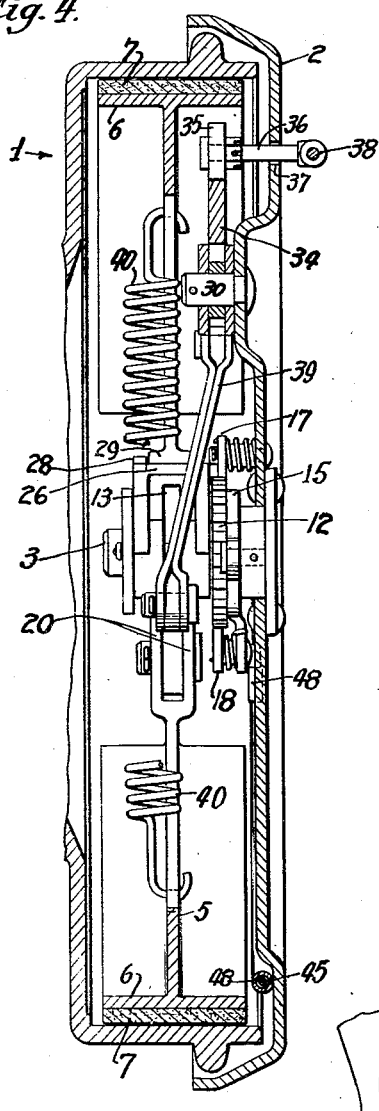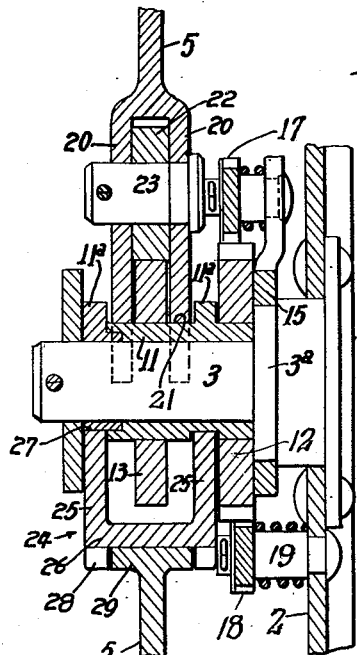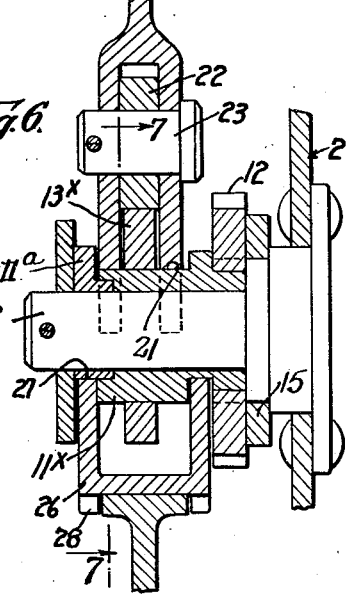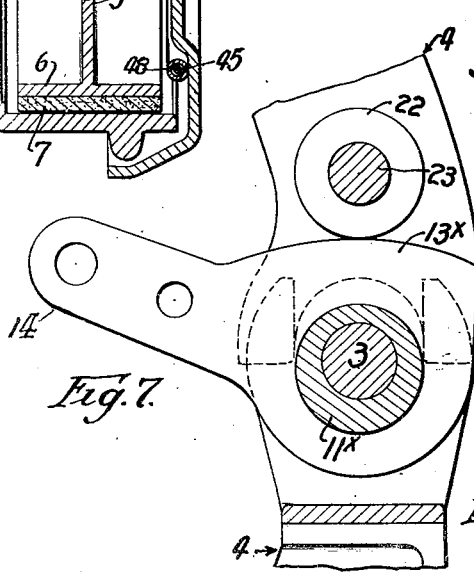

May 28, 1935.  G. W. HARPER ET AL  2,002,813
BRAKE FOR AUTOMOTIVE VEHICLES
Filed Nov. 5, 1932  3 Sheets-Sheet 3
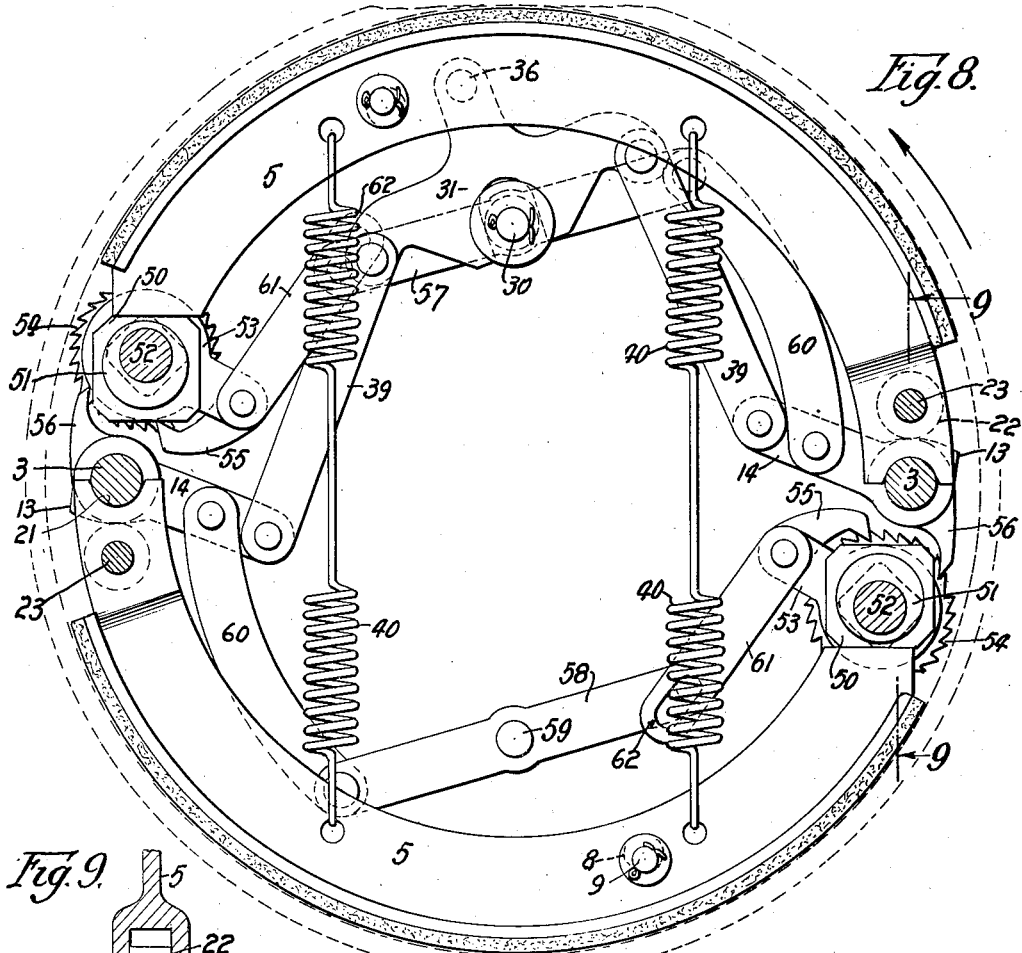
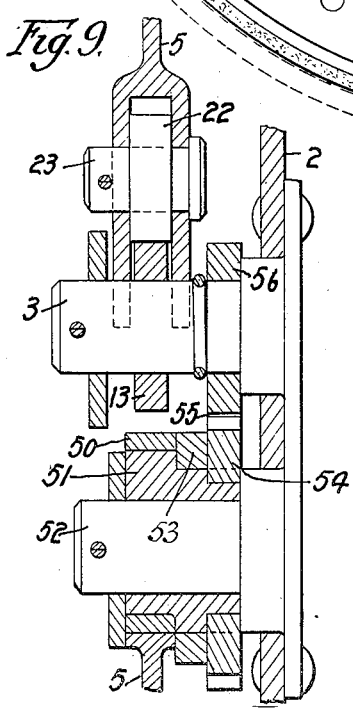
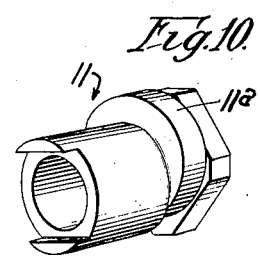
Inventors:
George W. Harper,
Albert R. Catto,
By: Arthur Wm Nilon Atty.

Patented May 28, 1935

2,002,813

UNITED STATES PATENT OFFICE 2,002,813

BRAKE FOR AUTOMOTIVE VEHICLES

George W. Harper and Albert R. Catto, Cleveland, Ohio, assignors to The Columbia Axle Company, Cleveland, Ohio, a corporation of Ohio Application November 5, 1932, Serial No. 641,354

20 Claims. (Cl. 188—79.5)

This invention relates to improvements in brakes for automotive vehicles and it consists of the matters hereinafter described and more particularly pointed out in the appended claims.

One of the objects of the invention is to provide a brake, including a plurality of brake shoes, which, after initial engagement with an associated drum, are self-energizing to bring said shoes into complete braking engagement with said drum when the same is rotating in one direction, thus rendering the brake more efficient.

Another object of the invention is to provide a brake which automatically adjusts itself to compensate for the wear upon the brake shoe facings so that the brake has a greater period of usefulness.

A further object of the invention is to provide a brake including a pair of substantially semi-circular brake shoes, each having an actuating cam associated with one end thereof, to expand said end into initial engagement with the drum, in one direction of its rotation which assists in energizing the brake so that the shoes enter into complete braking engagement with said drum, there being means actuated by said cams to adjust the shoes as the bands wear down so that the manual effort to operate the brakes is always substantially constant.

Still another object of the invention is to provide a brake mechanism of this kind which is simple in construction, is strong and rigid though light in weight and requires no service attention throughout its period of usefulness and is efficient in operation for its intended purpose.

The above mentioned objects of the invention as well as others, together with the many advantages thereof, will more fully appear as we proceed with our specification.

In the drawings:

Fig. 1 is a view in elevation of the face of a brake embodying our invention;

Fig. 2 is a detail view of parts shown at the left hand side of Fig. 1, with certain parts omitted to better show the construction and arrangement of the remaining parts thereof;

Fig. 3 is a detail view of parts shown at the right hand side of Fig. 1 with certain parts shown in section to better disclose the construction thereof;

Fig. 4 is a vertical sectional view through the brake as taken on the line 4—4 of Fig. 1;

Fig. 5 is a detail vertical sectional view through a part of the brake on an enlarged scale as taken on the line 5—5 of Fig. 1;

Fig. 6 is a view similar to Fig. 5 but illustrates a slightly modified form of the invention;

Fig. 7 is a detail vertical sectional view as taken on the line 7—7 of Fig. 6;

Fig. 8 is a view similar to Fig. 1 and illustrates a further modified form of the invention;

Fig. 9 is a detail vertical sectional view on an enlarged scale through a part of Fig. 8 as taken on the line 9—9 thereof; and Fig. 10 is a detail view in perspective of a certain part employed in the brake and which will be more fully referred to later.

In general, our improved brake includes a brake drum cover plate which carries a pair of substantially semi-circular brake shoes, each normally engaged at one end with an anchor pin and on the anchor pin for one shoe is mounted cam mechanism for actuating the same into braking engagement with the associated braking mechanism. The cams for both shoes are connected through linkage with a pivotally mounted equalizing lever, in turn actuated by a cable or rod from the service brake pedal. If desired, said lever may also be connected up with the parking and emergency brake lever.

Means are also provided on said anchor pins which, in the movement of the cams through an angle greater than a predetermined one, due to wearing of the associated bands, operates to so move the shoes on the carrier plate as to take up the wear on the brake shoe facings and thus maintain the shoes in constant adjustment with respect to the associated brake drum, the take up means for one shoe being arranged adjacent the actuating cam of the other shoe.

Referring now in detail to that embodiment of the invention, illustrated in Figs. 1 to 5 inclusive, of the accompanying drawings:

1 indicates as a whole a brake drum rotatable with a wheel and 2 indicates a cover plate for the open end of the drum and which plate is so mounted upon a convenient part of the vehicle as to be held against movement. Fixed to said plate at diametrically opposite points are studs 3—3 which extend toward the brake drum.

4—4 indicate the top and bottom shoes of the brake. Each shoe which is substantially semi-circular is of T-shaped cross section and includes a radial web 5, and an annular flange 6. Secured in any suitable manner to said flange is a friction facing or lining 7. At a point between the ends of the web of each shoe is an opening 8 best shown in dotted lines in Fig. 1 through which a stud 9 carried by the cover plate 2 extends. The hole 8 is of a diameter greater than that of the stud 9 so that the shoe is capable of a limited radial floating movement, a washer and cotter pin 10 on said stud preventing undue axial movement of the shoe.

Rotatably mounted on each stud 3 is a sleeve 11 and fixed to one end thereof is a ratchet wheel 12. Also rotatably mounted on said sleeve is a cam 13 provided with an actuating lever 14 which extends inwardly therefrom. As best shown in Fig. 5 said sleeve 11 is made in two interengaging parts for purpose of easier assembly of the cam 13 and its lever thereon, said parts of the sleeve each carrying an eccentric 11a spaced one on each side of said cam 13. 15 indicates a pawl carrying plate rotatably mounted upon a shouldered enlargement 3a of the associated stud 3 and which plate includes an inwardly extending lever arm 16. On said plate is mounted a spring pressed pusher pawl 17 for engagement with the teeth of the associated ratchet wheel 12 and a spring pressed holding pawl 18 is mounted on a pin 19 carried by the plate 2. These pawls engage the teeth of the ratchet wheel 12 at desired points thereon.

One end of the web 5 of each shoe is bifurcated to provide laterally spaced parts 20 and each part is provided in its extremity with an arcuate recess 21 as best shown in Fig. 3 to engage upon the concentric part of the sleeve 11 between its eccentrics 11a. Between said parts 20—20 of each shoe is provided a roller 22 which is journalled on a pin 23 extending through said parts 20 and this roller has a peripheral engagement with the cam 13.

Associated with the eccentrics 11a of each sleeve 11 is a stirrup 24 including laterally spaced side plates 25 and a connecting wall 26. In the free ends of the side plates is a recess 27 engaged with the eccentrics 11a and on the connecting wall is a pair of laterally spaced shoulders 28.

The other end of the web 5 of each shoe is formed with a flat end flange 29 for engagement with the connecting wall 26 of a stirrup between the shoulders 28 and these shoulders hold said flange against lateral displacement. It is pointed out that the opposite ends of the top and bottom shoes are operatively associated with parts on the same stud 3 as best shown in Fig. 1.

Extending inwardly from the cover plate 2, and spaced radially inward from the web of the top shoe of the brake is a stud 30. A walking beam lever 31 is provided in its bottom edge with a recess 32 which so engages on said stud as to have a floating rocking movement thereon, suitable washers 33 holding said lever against movement endwise of the stud. This lever includes oppositely disposed load arms 34—34 and a power arm 35 and said power arm is provided with a stud 36 which projects through a suitable opening 37 in the plate 2 and there has connected to it, a cable or link 38 for imparting movement thereto.

The lever arms 34—34 are each connected by a link 39 with the lever 14 of an associated cam 13. Both brake shoes 4—4 are connected together by contractible helical springs 40 as shown to hold said shoes in that position having a normal clearance with respect to the flange of the associated brake drum.

The lever 14 of each cam 13 has mounted thereon for a swivel movement a block 41. Slidable through each swivel block is a cross head rod 42, and each rod is provided at one end with a shoulder 43 normally spaced from the swivel block and is provided at its other end with a nut 44 which is normally engaged with said swivel block when cam 13 is in the "off" position, with brakes free. A Bowden wire 45 is fixed at one end to a cross head 42 and the other end of said wide is provided with a clevis arrangement 46 attached to the arm 16 of the plate 15. Each wire is enclosed between its ends in a conventional sheathing tube 47, securely fixed to the cover plate as a relatively large U-shaped loop by clips 48, said loops being arranged at the top and bottom of the cover plate. This arrangement eliminates sharp bends and permits the Bowden wires to easily slide through their associated sheathings without binding.

Assume now that the vehicle of which the brake forms a part is in motion and that it is desired to slow down or stop the same. A pull is then exerted upon the brake rod or cable 38 and this will rock the walking beam lever 31 in a clockwise direction as viewed in Fig. 1 upon the stud 30. Through said lever the right hand link 39 is thrust downward and the left hand link 39 is pulled upward and as the lever 31 can slide on the stud 30 in a direction substantially parallel with said links because of the recess 32, the effort applied to said links is equal. As the links are connected to the levers 14 of the cams 13, said cams are turned upon the studs 3 and engage the cams against the rollers 22 carried by the bifurcated ends of the shoes 4. This will expand said end of said shoes until some part of the facing thereof contacts the inner surface of the brake drum flange.

Further pressure from the cam levers causes the shoes to be elastically deformed until their facings contact the brake drum flange around substantially its circumference and causes the other end of each shoe to slide along the connecting wall 26 of its associated stirrup 24, thus completing the intimate contact between the shoes and drum. The above assumes that the shoes are in proper adjustment with respect to the brake drum flange with about .008 to .010 inches of clearance therebetween.

The angle through which each cam 13 rocks or turns to take up the clearance between the brake shoe facings and drum flange is determined by the clearance between the brake shoe facings and inside diameter of the drum. The distance between the parts 43—44 is adjusted so that the levers 14 and in consequence, the blocks 41 can oscillate through a sufficient angle to bring the brake shoe facings into intimate contact with the inside diameter of the drum without the swivel block engaging the cross head 43 and imparting movement to the Bowden wire 45.

Assume now that one or both brake shoes, through wearing away of their associated facings, moves through a greater angle to effect full application of the shoes upon the brake drum flange. In this "over" movement of said levers, the swivel blocks 41 will begin to contact an associated shoulder 43 on the cross head rod 42 and impart motion to the associated Bowden wire. This movement of the Bowden wire or wires will cause the plates 15 to rock about the shoulder parts 3a of the studs 3 and cause the pawls 17 to slide in and out upon that tooth of the associated ratchet wheels with which they are engaged.

As soon as the wear on the brake shoe facings is sufficient to cause the cam 13 to rock through a wide enough or abnormal angle, it will impart motion enough to the Bowden wires to rock the plates 15 far enough to permit the pawls 17 to slide by an entire tooth on the ratchet wheels 12 and upon the return stroke of the cam to "off"

position, the Bowden wires will drag the said plates and the ratchet wheels 12 around with them.

As the ratchet wheels 12 are fixed to the sleeves 11—11 and eccentrics 11a—11a this causes said sleeves to turn through an angle equal to that between the teeth of the ratchet wheels. These eccentrics are so positioned that this step of rocking or turning movement moves the stirrups 24 in the direction of the flanges 29 on the associated ends of the brake shoes, thereby taking up some of the clearance between the brake shoe facings and brake drum and brings the travel or strokes of the cam levers 14 back to the normal operating stroke. In this rocking or turning movement of the ratchet wheels, the pawls 18 hold said wheels from rotating against the forward drag of the pawls 17 and the rotation effort of the eccentrics from the brake shoe load against the stirrups 24.

It will be apparent from the foregoing that the effort applied to each brake shoe is equal and that the wear on each shoe is adjusted by the overtravel or movement of its associated cam 13 so that the brake shoes are automatically maintained in constant perfect adjustment. It is to be further noted that the rachet wheels 12 are operated on the return stroke of the associated cam levers and Bowden wires when the load on said shoes and cams has been relieved.

From the above, it is further apparent that each shoe is energized by its own cam lever in the "go ahead" direction and which direction is indicated by the arrow in Fig. 1. This renders the brake more effective and distributes the wear on both brake shoes, thereby increasing the life thereof materially over those in a two shoe brake wherein only one shoe is energized in the "go ahead" direction.

In Figs. 6 and 7, we have shown a slightly modified form of construction wherein it is possible to adjust the shoes in the vicinities of the cams 13. In said figures, instead of making the sleeve 11 concentric with the studs 3, we make it eccentric as at 11x and on this eccentric sleeve the cam 13x oscillates and the recesses 21 in the bifurcated end of the associated brake shoe are engaged.

This eccentric sleeve arrangement is an approximately opposite phase to the eccentrics 11a—11a so that the effect of turning or rocking the ratchet wheels 12 will be to adjust the anchored or stirrup end of one shoe and the cam end of the other shoe away from each other. In this instance the adjustment of the cams will be by the overtravel of the other shoe. In so proportioning the eccentrics 11x, we make the same about one half of that of the eccentrics 11a so that the rotation of the former (11x) will be radially outward from the axis of the brake as well as in the desired direction for adjustment.

In Figs. 8 and 9, I have illustrated a further modified form of construction wherein the Bowden wire arrangement is replaced by a linkage arrangement. In said construction one end of each brake shoe is bifurcated and is provided with the recesses 21 to engage on the studs 3 as before but the opposite end of each shoe carries a bearing block 50 in which is journalled an eccentric bushing 51 mounted on a shaft 52. Rockable on said eccentric is a lever plate 53 and fixed with respect to said eccentric is a ratchet wheel 54. Said lever plate carries a spring pressed pawl 55 for engagement with the ratchet wheel. A spring pressed holding pawl 56 is mounted on the stud 3 for engagement with the ratchet wheel to prevent reverse movement thereof.

On the stud 30 before mentioned, a lever 57 is pivotally mounted at a point between its ends. A second and similar lever 58 is mounted at a point between its ends on a stud 59 extending inwardly from the brake drum cover plate at the bottom thereof.

Curved links 60 connect one arm of the levers 57—58 with the levers 14 of the cams 13, while links 61 connect the levers 53 with the other arm of the levers 57—58. As best shown in Fig. 8, the connection between said last mentioned arms of the levers 58 and the links 61 is a pin and slot connection 62.

Assume that the "go ahead" direction is as indicated by the arrow in Fig. 8. When the walking beam lever 31 is rocked clockwise by a pull on the brake rod or cable 38, the links 39 act to rock the cams 13 through the levers 14. With the brake shoes in a condition having only the desired amount of clearance with the brake drum flange, this rocking movement of the lever 31 through the links 60 and levers 57—58 will rock the members 53 through that degree wherein the pawls 55 each slide back and forth with that tooth of its associated ratchet wheel 54 with which it is engaged.

When the shoe facings wear down, it is apparent that the lever 31 will have to swing through a greater angle to provide the desired braking engagement between the brake shoe facings and brake drum flange. This greater movement provides sufficient overage to operate through the links 60—61 and levers 57—58 to cause each of the pawls 55 to slip back of that tooth upon which it previously rode.

When that force exerted upon the lever 31 is released and the parts return to normal position, the pawls 55 act to feed the ratchet wheels through that angle defined by one tooth of said wheels, each pawl 56 slipping over its tooth to engage behind the same. This movement of the ratchet wheels will turn the eccentric bushings 51 in the block-like ends 50 of the shoes and will take up the clearance as provided by the wear in the brake shoe facings and will bring the travel of the levers 14 back to their normal working stroke.

With the means described for taking up the "wear" clearance of the brake shoe facings, it is possible to start with the brakes out of adjustment. When the vehicle is stationary, by actuating the usual service brake pedal, the ratcheting action starts to adjust the shoes and each shoe so soon as it reaches its work position with proper clearance stops ratcheting and the other keeps on ratcheting until it too, has been brought into proper working adjustment.

In the present embodiment of the invention, only a single actuating pawl is employed with each ratchet wheel in connection with the associated holding pawl. If desired, such a single actuating pawl may be replaced by a pair of actuating pawls so mounted on a lever 15 that one of them will ratchet over only a half of a tooth on the ratchet wheel in the overmovement of the cam levers, instead of over a whole tooth. This would have the effect of making the adjustment twice as fine.

While in describing the invention, we have referred in detail to the form, arrangement and construction of the various parts thereof, the same is to be considered merely as illustrative of preferred forms of the invention, so that we do not wish to be limited thereto except as may be specifically set forth in the appended claims.

We claim as our invention:

1. A brake embodying therein a pair of brake shoes arranged each with one end adjacent the opposite end of the other shoe, a plurality of means each associated with the like end of each shoe for moving said shoe into braking engagement with an associated brake drum, and a second plurality of means, each associated with the other end of each shoe for automatically taking up the wear on the braking faces of said shoes.

2. A brake embodying therein a pair of brake shoes arranged with the same end of each shoe adjacent the opposite end of the other shoe, a plurality of means each associated with the same end of each shoe for moving them into braking engagement with an associated brake drum and a second plurality of means, each associated with said opposite end of each shoe for automatically taking up the wear on the braking faces of said shoes, and means connecting each means of said first mentioned plurality of means with the other one of each of said second mentioned plurality of means.

3. A brake embodying therein a plurality of brake shoes arranged with the energizable end of each shoe adjacent the substantially anchored end of the other shoe, means operable upon said energizable end of each shoe for moving it into braking engagement with an associated brake drum, and a member positioned adjacent the substantially anchored end of one shoe and independent of the actuating means for said energizable end of the adjacent shoe for providing a sliding bearing engagement for said anchored end of each shoe and means for effecting the take up of wear on the operative surface of each brake shoe.

4. A brake embodying therein a pair of brake shoes arranged with one end of one shoe adjacent the opposite end of the other shoe, means operable upon one end of one shoe for moving it into braking engagement with an associated brake drum, and a member positioned adjacent the said opposite end of said other shoe for providing a sliding guiding bearing engagement therefor and means operable upon one of said ends of each shoe for effecting the take up of wear on the operative surface of each brake shoe.

5. A brake embodying therein a pair of brake shoes arranged with one end of one shoe adjacent the opposite end of the other shoe, a cam member operable upon one end of one shoe for moving it into engagement with an associated brake drum, means providing an axis for said cam member, and a member engaged at one end with said cam axis providing means and formed at its other end to provide a sliding bearing engagement for the opposite end of the other shoe and means operable upon one end of each shoe for effecting the take up of wear on the operative surface of each shoe.

6. A brake embodying therein a brake drum cover plate, a pair of brake shoes mounted thereon, arcuately spaced studs on said cover plate, a cam member mounted on each stud and each operable to engage the like end of each shoe, means associated with each stud and providing a sliding guiding bearing for the opposite end of each shoe, the actuating cam member for said one end of one shoe and the sliding guiding bearing means for the opposite end of the other shoe being associated with the same stud and means mounted on each stud and operable to effect a take up of wear on the operative surface of each brake shoe.

7. A brake embodying therein a brake drum cover plate, a pair of brake shoes mounted thereon and each having ends, one end of each shoe being unlike, pivoted means each associated with the same end of both shoes for moving said same ends into braking engagement with said brake drum, other means each operatively engaging the other and same ends of both shoes to provide an abutment therefor, and means for simultaneously actuating both of said pivoted means, said simultaneously actuating means being formed to equalize the movement of both of said pivoted means.

8. A brake embodying therein a brake drum cover plate, a pair of brake shoes mounted thereon, pivoted means associated with one end of each shoe for moving it into braking engagement with said brake drum, means operatively engaging the other end of each shoe to provide an abutment therefor, links each connected at one end to an associated pivoted means, an actuating lever for imparting movement to both of said links, and means for mounting said lever on said cover plate so as to equalize the movement of said links.

9. In a brake, a pair of brake shoes, having opposite ends arranged adjacent each other, a pivotally mounted cam, a roller carried on one end of each shoe and engaged by said cam, means associated with each cam but normally independent thereof for providing a sliding bearing engagement for the other end of each brake shoe, means for imparting simultaneous movement to both of said cam members for actuating the associated roller carrying end of each shoe into operative engagement with the associated brake drum and means operable in an over-movement of the cams for effecting a take up of the wear on the operative surface of each brake shoe.

10. In a brake a pair of brake shoes having opposite ends arranged adjacent each other, means for actuating one end of each shoe into operative engagement with an associated brake drum, a stirrup providing a sliding bearing engagement for the other end of each shoe and means operating in an abnormal movement of said actuating means for one end of said shoes for actuating the stirrup associated with the other end of the same shoe for moving said other end of the said shoes outwardly a distance corresponding to the abnormal amount of movement of said actuating means.

11. In a brake, a cover plate, a pair of brake shoes mounted thereon and each including an energizing end and an abutment end with the energizing end of one shoe associated with the abutment end of the other shoe, said associated ends of both shoes being located at opposite points on the cover plate, the operative faces of said shoes having a normal clearance with respect to an associated brake drum, means disposed in operative relation with respect to the associated ends of both shoes and operable upon the application of a force thereto for actuating the energizing end of each shoe through said clearance and through an abnormal clearance due to wear of said faces, into braking engagement with said drum, and means associated with the abutment end of each shoe and operative as said force is released to so move said shoes as to reestablish said normal clearance.

12. In a brake, a cover plate, a pair of brake shoes mounted thereon and each including an energizing end and an abutment end, with the energizing end of one shoe associated with the abutment end of the other shoe, said associated ends of both shoes being located at opposite points on the cover plate, the operative faces of said shoes having a normal clearance with respect to an associated brake drum, means disposed in operative relation with respect to the associated ends of both shoes and operable upon the application of a force thereto for actuating the energizing end of each shoe through said clearance and through an abnormal clearance due to wear of said faces, into braking engagement with said drum, and means associated with the abutment end of each shoe and operatively connected to the energizing end of the other shoe for moving said shoes to reestablish said normal clearance when said force is released.

13. In a brake, a pair of brake shoes spaced apart at their ends to provide gaps therebetween, means adjacent each gap for actuating said shoes into operative engagement with an associated brake drum, and means also adjacent each gap for effecting a take-up of wear in the faces of said shoes, the last mentioned means adjacent one gap being actuated by the first mentioned means adjacent the other gap.

14. In a brake a pair of brake shoes, devices associated with one end of each shoe for expanding the shoe into operative engagement with an associated brake drum, means for simultaneously actuating the devices for both shoes, a take-up mechanism associated with the other end of each shoe, the take-up mechanism for one shoe being located adjacent the expanding devices of the other shoe and means connecting the devices of one shoe at one end thereof, with the take-up mechanism for the same shoe at the other end thereof for so actuating said take-up mechanism.

15. In a brake, a pair of brake shoes, a lever actuated cam associated with one end of each shoe for expanding it into braking engagement with an associated brake drum, a mechanism associated with the other end of each shoe for taking up wear in the faces of said shoes, an eccentric and a ratchet wheel embodied in each take-up mechanism, and means connecting the cam associated with one end of one shoe with the pawl and ratchet wheel associated with the other end of the same shoe for actuating the same upon an overmovement of said lever actuated cam.

16. In a brake, a pair of brake shoes, a lever actuated cam associated with one end of each shoe for expanding it into braking engagement with an associated brake drum, a mechanism associated with the other end of each shoe for taking up wear in the faces of said shoes, an eccentric and a ratchet wheel embodied in each take-up mechanism, a force applying equalizing lever operatively connected to the levers of both cams, and a flexible means connecting lever of one cam at one end of one of said shoes with the eccentric and ratchet wheel at the other end of the same shoe for actuating the same upon an overmovement of said lever actuated cam.

17. A brake embodying therein means providing adjacent pairs of brake shoe ends, one end of each pair being an anchor end and the other end of each pair being a movable end, and mechanisms each arranged between the brake shoe ends of each pair thereof, a part of each mechanism being operable to expand the associated movable brake shoe end into braking engagement with an associated brake drum and another part of each mechanism being actuatable from the first mentioned part of another mechanism to automatically take up wear on the shoes through the anchor end thereof.

18. A brake embodying therein a plurality of arcuate brake shoes, each having an anchor end and a movable end, said shoes being arranged with the anchor end of one shoe substantially adjacent and facing the movable end of the other shoe, and mechanisms each arranged between the anchor end and the movable end of said shoes, a part of each mechanism being operable to expand the associated movable brake shoe end into braking engagement with an associated brake drum and another part of each mechanism being actuatable from the first mentioned part of the other mechanism for automatically taking up wear on the braking face of said shoes.

19. A brake embodying therein a plurality of arcuate brake shoes, each having an anchor end and a movable end, said shoes being arranged with the anchor end of one shoe substantially adjacent and facing the movable end of an adjacent shoe, mechanisms each arranged between the anchor end of one shoe and the movable end of another shoe, a part of each mechanism being operable to expand the associated movable brake shoe end into braking engagement with an associated brake drum and another part of each mechanism being actuatable from the first mentioned part of another mechanism for automatically taking up wear on the braking face of said shoes, means common to the first mentioned part of said mechanisms for simultaneously actuating them, and means connecting said another part of one mechanism with the first mentioned part of another mechanism so that said mechanism parts operate simultaneously.

20. A brake embodying a cover plate, studs arranged at substantially diametrically opposite sides of the plate, a pair of brake shoes, each having an end with an anchor engagement upon an associated stud and each having a movable end, the movable end of one shoe facing the anchor end of the other shoe, mechanisms, one associated with each stud and each including parts engaged with the movable end of an associated shoe for expanding the same into engagement with an associated brake drum, said mechanisms each including parts operating upon the anchor end of an associated shoe for taking up wear in the braking surface of said shoe, and means for simultaneously actuating the first mentioned parts of both mechanisms and including devices for equalizing the effort applied thereto.

GEORGE W. HARPER.
ALBERT R. CATTO.

CERTIFICATE OF CORRECTION.

Patent No. 2,002,813.                                                   May 28, 1935.

GEORGE W. HARPER, ET AL.

It is hereby certified that error appears in the printed specification of the above numbered patent requiring correction as follows: Page 4, second column, line 6, claim 7, after "unlike" and before the comma insert the words the other end of the same shoe, said shoes being disposed, each with one end adjacent the unlike end of the other shoe; and that the said Letters Patent should be read with this correction therein that the same may conform to the record of the case in the Patent Office.

Signed and sealed this 9th day of July, A. D. 1935.

Bryan M. Battey (Seal)                               Acting Commissioner of Patents.